May 23, 1961 R. D. STODDARD 2,984,919
SNOW REMOVAL ATTACHMENT FOR A ROTARY LAWN MOWER
Filed Aug. 1, 1958 2 Sheets-Sheet 1
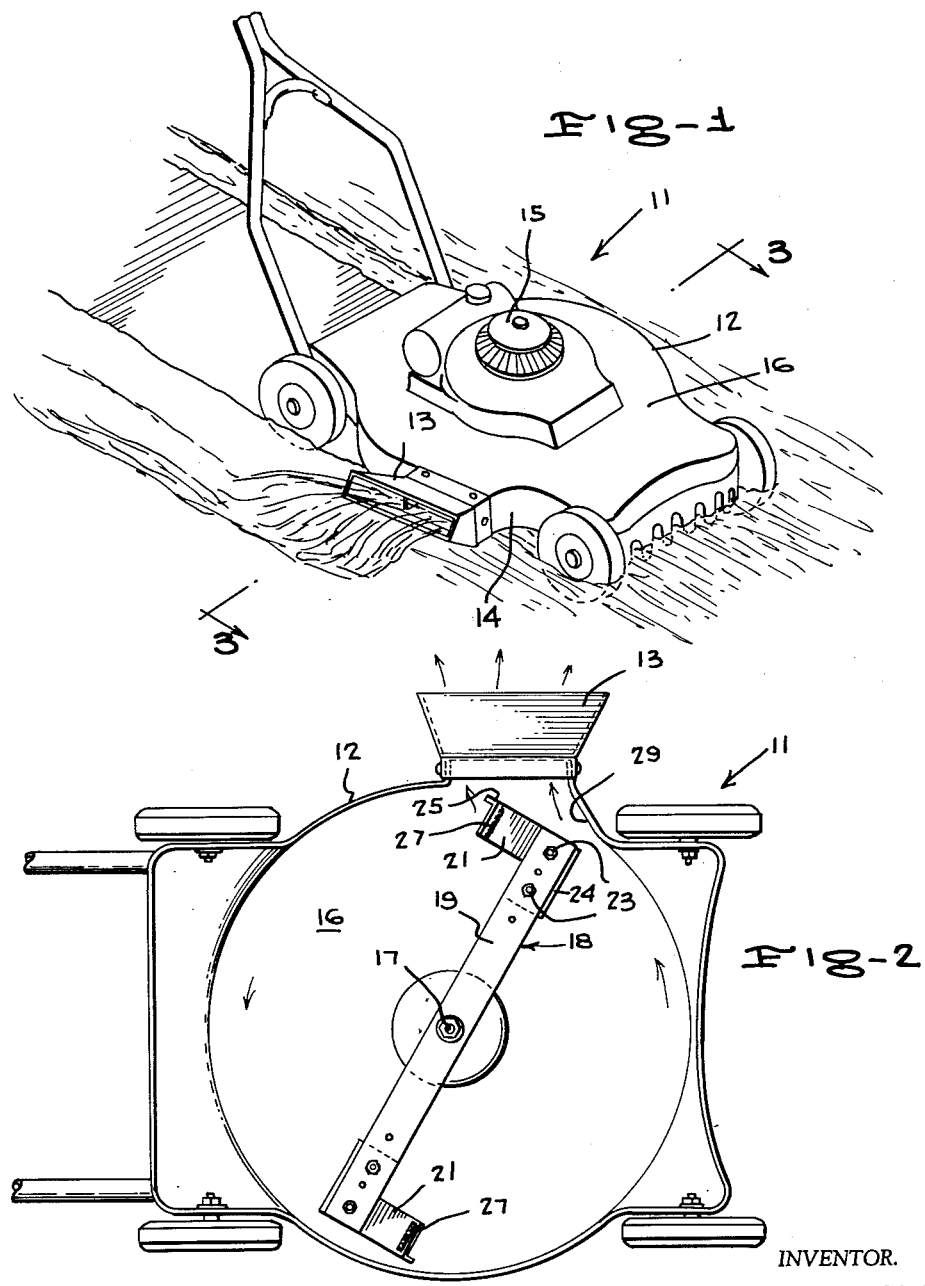
INVENTOR.
RICHARD D. STODDARD
BY
McMorrow, Berman & Davidson
ATTORNEYS

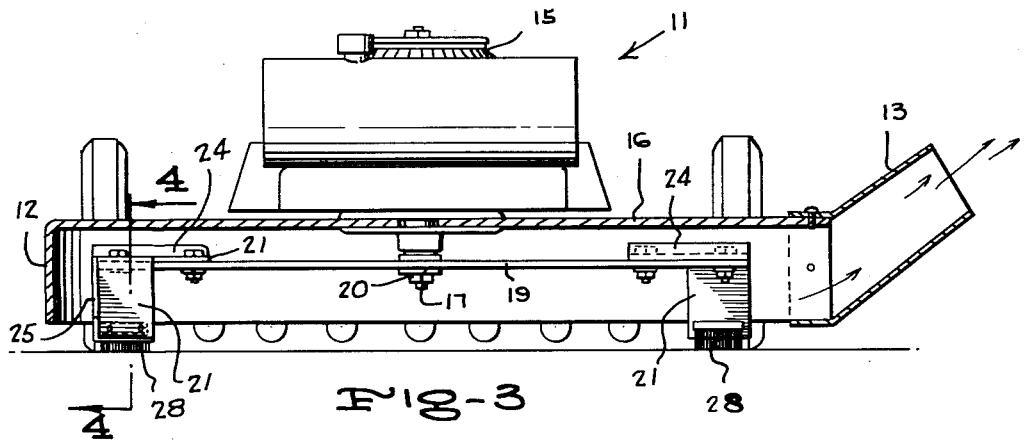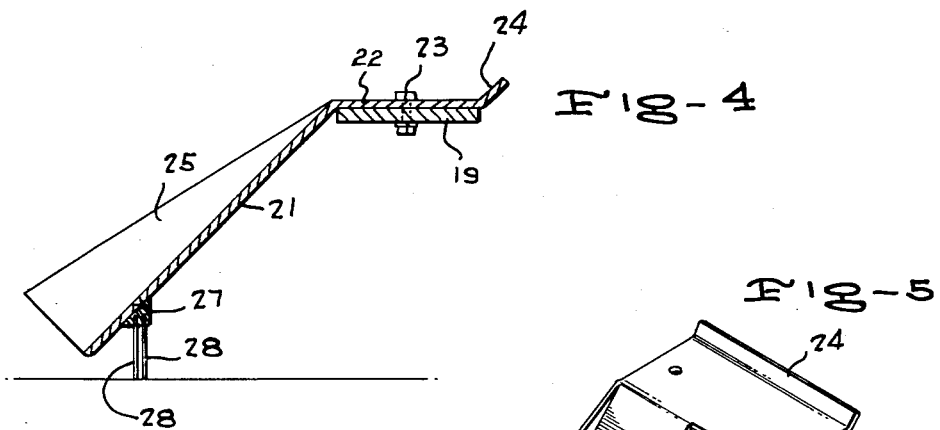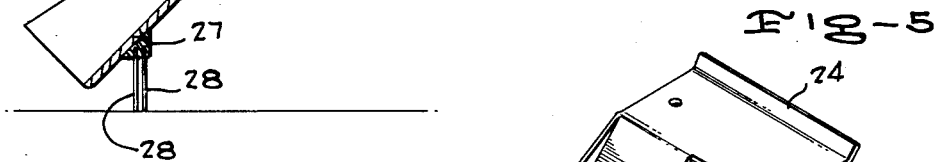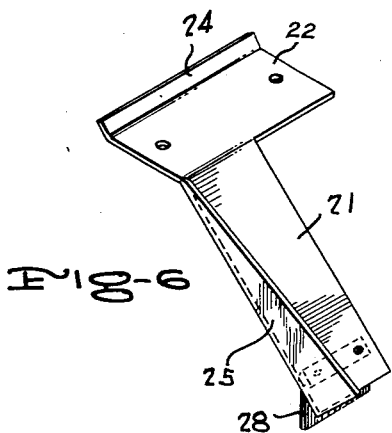

United States Patent Office 2,984,919
Patented May 23, 1961

2,984,919

SNOW REMOVAL ATTACHMENT FOR A ROTARY LAWN MOWER

Richard D. Stoddard, Burlington, Iowa
(1010 Waynoka, Hastings, Nebr.)

Filed Aug. 1, 1958, Ser. No. 752,650

3 Claims. (Cl. 37—53)

This invention relates to a snow plow apparatus, and more particularly to an apparatus for converting a conventional power lawn mower of the rotary type into a snow plow apparatus.

In conventional rotary power mowers the rapidly rotating blade serves in part as a fan to produce suction and hence an updraft that lifts the grass to erect cutting position and to carry grass and other light weight particles upwardly in a rotating air column and out through the discharge opening. While this arrangement serves to cut and discharge grass, it is ineffective with snow and merely agitates it to create a billow of snow without direction. In accordance with the present invention, the motor, housing, and other parts of a lawn mower of this type are utilized in conjunction with a special rotary support that uses blower rather than fan action. In brief, the support has no substantial blowing effect except at its ends, where it is provided with a pair of sloping vanes or scoops. The vanes or scoops travel in front of the support and extend underneath the air (and snow) to push the same upwardly without significant fan or vacuum action. Each vane or scoop has an upstanding flange at its outer edge which restrains the air (and snow) against flying outwardly. It has been found that with this structure the air and snow are scooped up in a rotating column located beneath the roof of the lawn mower housing from which the air and snow are discharged laterally through the housing opening which is a part of all rotary lawn mowers.

A main object of the invention is to provide a novel and improved snow plow apparatus which may be constructed from a conventional rotary lawn mower by substituting the attachment of the present invention in place of the rotary blade of the lawn mower, the attachment being simple in construction, being easy to install, and providing an efficient and rapid snow removing action when the device is employed for clearing snow.

A further object of the invention is to provide an improved snow plow apparatus which involves relatively inexpensive components, which is durable in construction, and which utilizes a conventional lawn mower of the rotary blade type as its main portion, whereby a conventional rotary lawn mower may be readily converted for use as a snow plow by removing its blade and substituting the snow plow attachment of the present invention.

Another object of the present invention is to provide a device by which the suction action of a rotary lawn mower is replaced by scoop action to create a rising rotating column of air and snow within the lawn mower housing, from which the snow is laterally discharged through the grass discharge opening and not underneath the sides of the housing.

Further objects and advantages of the invention will become apparent from the following description and claims, and from the accompanying drawings, wherein:

Figure 1 is a perspective view of a snow plow apparatus according to the present invention.

Figure 2 is an enlarged bottom view of the snow plow apparatus illustrated in Figure 1.

Figure 3 is a transverse vertical cross sectional view to an enlarged scale, taken substantially on the line 3—3 of Figure 1.

Figure 4 is an enlarged vertical cross sectional view taken on the line 4—4 of Figure 3.

Figure 5 is a perspective view of one of the vane or scoop elements employed in the snow plow apparatus of Figures 1 to 3.

Figure 6 is a perspective view taken from a different angle of the vane or scoop element illustrated in Figure 5.

Referring to the drawings, 11 generally designates a snow plow apparatus which is constructed by employing a conventional power mower of the rotary blade type and substituting a snow plow attachment according to the present invention, for the normal cutting blade of the lawn mower. Thus, the lawn mower comprises a wheeled housing 12 which is open at its bottom and which is provided with depending side walls or skirt elements 14 and an upwardly and laterally inclined discharge chute 13 communicatively connected to one side wall 14 thereof. The apparatus is provided with the conventional motor 15 which is mounted centrally on the top wall or roof 16 of housing 12 and which has the vertical shaft 17 extending into the central portion of the housing.

Normally, a cutting blade is centrally secured to the lower end of the motor shaft 17, but in accordance with the present invention, a snow plow attachment, designated generally at 18, is fastened to the lower end of shaft 17 in place of the grass cutting blade. Thus the attachment 18 comprises a horizontal support member 19 which is centrally secured to the lower end of the shaft 17 in place of the grass cutting blade. Thus, the tening nut 20 employed to secure the normal grass cutting blade to said shaft. Secured to the opposite end portions of the support member 19 are respective downwardly inclined plate-like vane or scoop elements 21, 21, said vane or scoop elements extending forwardly in the direction of rotation of the respective ends of the support member. Each vane or scoop element is provided with a generally rectangular, plate-like top portion 22 which is secured on the associated end portion of the support member 19 by suitable fastening means, such as by a pair of fastening bolts 23, 23 provided with suitable nuts. The plate-like portions 22 are formed at their side edges opposite the downwardly inclined main bodies of the plate-like members 21 with the upwardly and outwardly inclined longitudinal flanges 24. As shown in Figure 2, the flanges 24 extend along the respective side margins of the support member 19 and are of substantial length, being approximately twice the length of the downwardly inclined main bodies of the plate-like elements 21 in a direction parallel to the support member 19.

Each of the downwardly inclined main bodies of the plate-like vane or scoop portions 21 is formed on its outermost edge with an upstanding, generally triangular flange 25 which is of gradually increasing height outwardly toward the free end of the associated element 21. Thus, the flange 25, in combination with the associated plate-like element 21, defines a scoop-like member which is effective to elevate snow responsive to the rotation of the support member 19, and to project the elevated snow against the inclined flange 24 to cause the snow to be further elevated and projected upwardly and to be revolved in the space beneath the top wall 16 of housing 12 responsive to the rotation of the support member 19. This action takes place by reason of the positive upward push created by the passage of the vane element 21 underneath the air and snow.

Secured to the bottom surfaces of the inclined plate-like vane elements 21 at their outer end portions are the depending wire brush assemblies or prong elements 27, 27, said wire brush assemblies or prong elements comprising a pair of rows of depending resilient wire bristle elements 28 of sufficient length to engage the ground with a scraping and brushing action, the rows of bristles extending in directions parallel to the support member 19.

As shown, the interior of housing 12 is generally circular in contour except adjacent to the upwardly and outwardly inclined discharge chute 13, where the wall of the housing curves gently outwardly, as shown at 29, to guide material in the housing toward the chute 13.

In operation, the bristle elements 28 engage the ground immediately behind the inclined vane elements as the support member 19 rotates, causing the snow to be loosened and detached from the ground. The loose snow (either due to its initial condition or because of the action of the bristle elements) is then forced upwardly in the scoop-like members defined by the vane elements 21 and their associated upstanding flanges 25, the snow being thus raised to the level of the support member 19 and being further deflected upwardly by the action of the flanges 24. The vanes or scoops 21, as well as the flanges 24, act as blower elements to create a rotary movement of air subjacent the top wall 16 of housing 12, the air being mixed with the loosened snow and being rotated therewith until the mixture is discharged upwardly and outwardly through the discharge chute 13. The discharge chute is so located as to receive the rotating snow and air and discharge a portion of the same sidewise of the machine in the manner clearly illustrated in Figure 1. Thus, the apparatus not only loosens the snow from the pavement or ground, but also elevates the snow and provides a mixing and agitating action whereby the loosened snow is pulverized and mixed with air in the space immediately subjacent to the top wall 16 of housing 12, the mixture being of substantially uniform consistency and being of the proper consistency to be easily and efficiently discharged laterally through the chute member 13.

While a specific embodiment of an improved snow plow apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a snow plow apparatus of the character described, a wheeled housing open at its bottom and having a top wall and depending side walls, an upwardly and laterally inclined discharge chute communicatively connected to one side wall of said housing, a motor mounted substantially centrally on the top wall of said housing and having a vertical shaft extending into the central portion of the housing, a horizontal elongated support member secured to said shaft in said housing and having an end spaced from said shaft, a downwardly inclined plate-like scoop element secured to the end of said support member and extending substantially forwardly in the direction of rotation of said support member, said scoop element having a free end portion, and a row of depending, ground-engaging resilient prong elements extending in a direction substantially parallel to said support member and secured to the underside of the free end portion of said scoop element, whereby said scoop element rotates horizontally with said support member and elevates snow and projects same upwardly in the housing, mixing the snow with air in the space subjacent said top wall, so that the mixture of snow and air can be discharged through said chute.

2. In a snow plow apparatus of the character described, a wheeled housing open at its bottom and having a top wall and depending side walls, an upwardly and laterally inclined discharge chute communicatively connected to one side wall of said housing, a motor mounted substantially centrally on the top wall of said housing and having a vertical shaft extending into the central portion of the housing, a horizontal elongated support member secured to said shaft in said housing and having an end spaced from said shaft, a downwardly inclined plate-like scoop element secured to the end of said support member and extending substantially forwardly in the direction of rotation of said support member, said scoop element having a free end portion, an upstanding flange on one longitudinal margin of said scoop element, and a plurality of depending, ground-engaging resilient wire bristle elements arranged in a row extending substantially parallel to said support member and secured to the underside of the free end portion of said scoop element, whereby said scoop element rotates horizontally with said support member and elevates snow and projects same upwardly in the housing, mixing the snow with air in the space subjacent said top wall, so that the mixture of snow and air can be discharged through said chute.

3. In a snow plow apparatus of the character described, a wheeled housing open at its bottom and having a top wall and depending side walls, an upwardly and laterally inclined discharge chute communicatively connected to one side wall of said housing, a motor mounted on the top wall of said housing and having a vertical shaft extending into the central portion of the housing, a horizontal elongated support member secured to said shaft in said housing and having an end spaced from said shaft, a downwardly inclined plate-like scoop element secured to the end of said support member and extending substantially forwardly in the direction of rotation of said support member, said scoop element having a free end portion, an upstanding flange on the outermost longitudinal margin of said support blade member opposite said downwardly inclined scoop element and extending a substantial distance along said last-named margin, and a plurality of depending, ground-engaging resilient wire bristle elements arranged in a row extending substantially parallel to said support member and secured to the underside of the free end portion of said scoop element, whereby said scoop element rotates horizontally with said support member and elevates snow and projects same upwardly in the housing, mixing the snow with air in the space subjacent said top wall, so that the mixture of snow and air can be discharged through said chute.

References Cited in the file of this patent

UNITED STATES PATENTS

| Number | Name | Date |
|---|---|---|
| 1,601,718 | Buttweiler | Oct. 5, 1926 |
| 2,381,017 | Wandscheer | Aug. 7, 1945 |
| 2,719,396 | Morris et al. | Oct. 4, 1955 |
| 2,721,438 | O'Maley | Oct. 25, 1955 |
| 2,741,042 | Brown | Apr. 10, 1956 |
| 2,807,126 | Bennett | Sept. 24, 1957 |
| 2,836,021 | Wood et al. | May 27, 1958 |
| 2,836,029 | Johnson | May 27, 1958 |
| 2,863,162 | Draughon | Dec. 9, 1958 |
| 2,871,585 | Merry et al. | Feb. 3, 1959 |